US009459030B2

(12) United States Patent
Benouali et al.

(10) Patent No.: US 9,459,030 B2
(45) Date of Patent: Oct. 4, 2016

(54) THERMOSTATIC EXPANSION DEVICE AND AIR CONDITIONING LOOP COMPRISING SUCH A THERMOSTATIC EXPANSION DEVICE

(75) Inventors: Jugurtha Benouali, Clamart (FR); Jin-Ming Liu, Conflans Sainte Honorine (FR); Regine Haller, Boissy Sans Avoir (FR); Stefan Karl, Fourqueux (FR); Mohamed Yahia, Paris (FR); Christophe Rousseau, Le Perray en Yvelines (FR)

(73) Assignee: VALEO SYSTEMES THERMIQUES, Le Mesnil Denis (FR)

( * ) Notice: Subject to any disclaimer, the term of this patent is extended or adjusted under 35 U.S.C. 154(b) by 907 days.

(21) Appl. No.: 13/641,283

(22) PCT Filed: Apr. 12, 2011

(86) PCT No.: PCT/FR2011/000213
§ 371 (c)(1),
(2), (4) Date: Nov. 13, 2012

(87) PCT Pub. No.: WO2011/128527
PCT Pub. Date: Oct. 20, 2011

(65) Prior Publication Data
US 2013/0074536 A1    Mar. 28, 2013

(30) Foreign Application Priority Data

Apr. 16, 2010    (FR) ...................................... 10 01619

(51) Int. Cl.
*F25B 41/06* (2006.01)
*F16K 31/00* (2006.01)

(52) U.S. Cl.
CPC ........... *F25B 41/062* (2013.01); *F16K 31/002* (2013.01); *F25B 2341/0661* (2013.01); *F25B 2341/0683* (2013.01)

(58) Field of Classification Search
CPC F25B 41/062; F25B 41/04; F25B 2341/068; F25B 2341/0683
See application file for complete search history.

(56) References Cited

U.S. PATENT DOCUMENTS 1,782,689 A * 11/1930 Hoffman ................... F25B 5/02
126/214 C
2,141,715 A * 12/1938 Hilger ....................... F25B 5/02
137/239

(Continued)

FOREIGN PATENT DOCUMENTS

DE    4303533 A1    8/1994
FR    2743139 A1    7/1997

(Continued)

OTHER PUBLICATIONS

English language abstract and machine-assisted English translation for DE 4303533 extracted from the espacenet/cp. database on Dec. 19, 2012, 11 pages.

(Continued)

*Primary Examiner* — M. Alexandra Elve
*Assistant Examiner* — Alexis Cox
(74) *Attorney, Agent, or Firm* — Howard & Howard Attorneys PLLC (57) ABSTRACT

A device for expanding a refrigerant fluid has a first inlet and a first outlet which are connected by a first refrigerant circulation duct. The first refrigerant circulation duct has an upstream part and a downstream part which parts are placed in communication by a first communication passage. The device also has a second inlet and a second outlet which are connected by a second refrigerant circulation duct. The device regulates an expansion of the refrigerant fluid and has a first needle valve housed inside the upstream part of the first refrigerant flow duct connected by a first connecting rod to a thermostatic sensor in communication with the second refrigerant flow duct that allows or prevents refrigerant fluid from circulating through the first communicating passage. The device also measures the pressure of the refrigerant fluid entering the evaporator (Pse) which pressure measurement is taken at the first outlet.

6 Claims, 5 Drawing Sheets

(56) References Cited

U.S. PATENT DOCUMENTS

| | | | | |
|---|---|---|---|---|
| 2,160,453 | A * | 5/1939 | Boles | F25B 41/062 236/92 B |
| 3,817,053 | A * | 6/1974 | Orth | F25B 41/043 62/210 |
| 3,822,563 | A * | 7/1974 | Orth | F25B 41/043 236/92 B |
| 4,065,939 | A * | 1/1978 | Thornbery | F25B 41/043 236/92 B |
| 2001/0009099 | A1* | 7/2001 | Kobayashi | F16K 31/002 62/204 |
| 2001/0018830 | A1* | 9/2001 | Fukuda | B60H 1/00485 62/210 |
| 2001/0042851 | A1* | 11/2001 | Oh | B60H 1/00485 251/208 |
| 2002/0023460 | A1* | 2/2002 | Minowa | F25B 41/062 62/527 |
| 2002/0100812 | A1* | 8/2002 | Sudo | F25B 41/062 236/92 B |
| 2002/0194864 | A1* | 12/2002 | Hirota | F25B 41/062 62/498 |
| 2003/0010832 | A1* | 1/2003 | Kramer | F16K 31/0655 236/92 B |
| 2003/0019225 | A1* | 1/2003 | Breyer | F16K 31/406 62/225 |
| 2003/0151011 | A1* | 8/2003 | Hirota | F16K 31/406 251/30.01 |
| 2004/0036044 | A1* | 2/2004 | Hirota | F25B 41/062 251/30.02 |
| 2004/0163399 | A1* | 8/2004 | Kim | G05D 23/125 62/222 |
| 2006/0005556 | A1* | 1/2006 | Hirota | F04B 27/067 62/216 |
| 2007/0068194 | A1* | 3/2007 | Ise | F25B 41/062 62/527 |
| 2009/0045264 | A1* | 2/2009 | Lou | F25B 41/062 236/92 B |
| 2009/0288434 | A1* | 11/2009 | Lou | F25B 41/062 62/222 |
| 2010/0186434 | A1* | 7/2010 | Lou | F25B 41/062 62/222 |
| 2011/0132013 | A1* | 6/2011 | Ahn | B60H 1/323 62/222 |

FOREIGN PATENT DOCUMENTS

| | | |
|---|---|---|
| FR | 2934039 A1 | 1/2010 |
| JP | 2001-116399 A | 4/2001 |
| JP | 2004-324936 A | 11/2004 |
| JP | 2005-343285 A | 12/2005 |
| JP | 2005343285 A * | 12/2005 |
| WO | WO 01/01053 A1 | 1/2001 |

OTHER PUBLICATIONS

English language abstract and machine-assisted English translation for FR 2743139 extracted from the espacenet.com database on Dec. 19, 2012, 20 pages.

English language abstract and machine-assisted English translation for FF 2934039 extracted from the espacenet.com database on Dec. 19, 2012, 24 pages.

English language abstract and machine-assisted English translation for JP 2001-116399 extracted from the PAJ database on Dec. 19, 2012, 26 pages.

English language abstract and machine-assisted English translation for JP 2004-324936 extracted from the PAJ database on Dec. 19, 2012, 33 pages.

English language abstract and machine-assisted English translation for JP 2005-343285 extracted from the PAJ database on Dec. 19, 2012, 39 pages.

International Search Report for Application No. PCT/FR2011/00213 dated Jul. 12, 2011, 7 pages.

* cited by examiner

Fig.5 ment No. FR 2 743 139,

THERMOSTATIC EXPANSION DEVICE AND AIR CONDITIONING LOOP COMPRISING SUCH A THERMOSTATIC EXPANSION DEVICE

RELATED APPLICATIONS

This application is the National Stage of International Patent Application No. PCT/FR2011/000213, filed on Apr. 12, 2011, which claims priority to and all the advantages of French Patent Application No. FR 1001619, filed on Apr. 16, 2010.

The invention relates to the field of heating, ventilation and/or air conditioning installations, in particular for a motor vehicle. The subject of the invention is more particularly a thermostatic expansion device integrated into an air conditioning loop that is an integral part of such a heating, ventilation and/or air conditioning installation. Finally, another subject of the invention is an air conditioning loop comprising such a thermostatic expansion device.

A motor vehicle is commonly equipped with a heating, ventilation and/or air conditioning installation for modifying the aerothermal parameters of an air flow likely to be delivered into the interior of a passenger compartment of the vehicle. To this end, the heating, ventilation and/or air conditioning installation comprises a heating, ventilation and/or air conditioning unit that is able to channel the air flow before it is delivered into the interior of the passenger compartment. The heating, ventilation and/or air conditioning unit consists mainly of a housing made of a plastics material that is housed under an instrument panel of the vehicle.

In order to modify the temperature of the air flow before it is diffused into the passenger compartment, the heating, ventilation and/or air conditioning installation also comprises an air conditioning loop, inside which there circulates a refrigerant fluid, in particular a sub-critical refrigerant fluid, such as the one known under the designation R134a. The air conditioning loop comprises, in particular, a compressor, a condenser, an expansion device and an evaporator. The evaporator is housed inside the heating, ventilation and/or air conditioning unit in order to cool and/or dehumidify the air flow before it is delivered into the interior of the passenger compartment.

Among expansion devices, a thermostatic expansion device, such as the one described in document FR 2 743 139, is known.

A thermostatic expansion device has a first refrigerant fluid inlet connected to the condenser and a first refrigerant fluid outlet connected to the evaporator. The first inlet and the first outlet are connected together by way of a first refrigerant fluid circulation channel, inside which the refrigerant fluid is expanded.

The thermostatic expansion device also has a second refrigerant fluid inlet connected to the evaporator and a second refrigerant fluid outlet connected to the compressor. The second inlet and the second outlet are connected together by way of a second refrigerant fluid circulation channel.

The thermostatic expansion device has a means for regulating the expansion of the refrigerant fluid. The means for regulating the expansion connects a needle valve housed in the first circulation channel and a thermostatic sensor housed inside the second circulation channel. The needle valve is able to move between an open position, in which the needle valve allows circulation of refrigerant fluid from the first refrigerant fluid inlet to the first refrigerant fluid outlet, and a closed position, in which the needle valve prevents such circulation. The needle valve is in communication with a spring which tends to keep it in the closed position. When the refrigerant fluid inside the second circulation channel is at a pressure greater than a reference pressure, the thermostatic sensor exerts on the needle valve a force opposite to and greater than that exerted by the spring on the needle valve, thereby causing the needle valve to be moved to the open position.

Advantageously, these arrangements aim to regulate the overheating of the refrigerant fluid at the outlet of the evaporator.

The regulation means of the thermostatic expansion device needs to be improved in order to obtain an optimized thermal performance, that is to say an ability to best cool the air flow, to reduce the energy consumption of the compressor and to improve the thermostatic stability inside the thermostatic expansion device.

The aim of the present invention is to propose a device for expanding a refrigerant fluid arranged in an air conditioning loop of a heating, ventilation and/or air conditioning installation fitted in a motor vehicle, the air conditioning loop affording an optimized thermal performance, that is to say an ability to best cool an air flow circulating through an evaporator integrated in the air conditioning loop, low energy consumption of a compressor integrated into the air conditioning loop and improved thermostatic stability inside the expansion device.

The device for expanding a refrigerant fluid of the present invention comprises, firstly, a first expansion device inlet and a first expansion device outlet which are connected by a first refrigerant fluid circulation channel, the first refrigerant fluid circulation channel comprising an upstream part and a downstream part that are placed in communication by a first communication duct, and, secondly, a second expansion device inlet and a second expansion device outlet which are connected by a second refrigerant fluid circulation channel. In addition, the expansion device has a means for regulating expansion of the refrigerant fluid comprising a first needle valve housed inside the upstream part of the first refrigerant fluid circulation channel, the first needle valve being connected by way of a first linking rod to a thermostatic sensor in communication with the second refrigerant fluid circulation channel. The first needle valve is able to allow or prevent circulation of the refrigerant fluid inside the first communication duct.

According to the present invention, the regulation means comprises a means for measuring an evaporator inlet refrigerant fluid pressure taken at the first expansion device outlet.

According to a first variant embodiment, the measurement means comprises a second chamber in communication with the downstream part of the first refrigerant fluid circulation channel by way of a second communication duct.

The second chamber advantageously houses a return member connected to a plate secured to the first linking rod.

According to a first alternative, the plate is, for example, mounted such as to be able to slide inside a sheath that confines the lower face of the plate.

According to a second alternative, the plate is, again for example, provided with a bellows that confines the lower face of the plate.

According to a second variant embodiment, in addition or as an alternative to the first variant embodiment, the measurement means comprises a support plate housed inside the upstream part of the first refrigerant fluid circulation channel. According to this design, the support plate is connected to the first needle valve by way of a second linking rod, the support plate having a lower surface in contact with a stressing member, in particular a spring.

The support plate is preferably mounted such as to be able to slide inside a sleeve that confines the lower surface.

According to a third variant embodiment, in addition or as an alternative to the first and second variant embodiments, the measurement means comprises a second needle valve housed in the upstream part of the first refrigerant fluid circulation channel. According to this design, the second needle valve is able to allow or prevent circulation of refrigerant fluid inside a third communication duct formed between the upstream part and the downstream part of the first refrigerant fluid circulation channel.

The second needle valve is preferably carried by a support rod in communication with a plate in contact with a return member.

An air conditioning loop according to the present invention comprises a compressor, a condenser, an evaporator and an expansion device such as defined above. The air conditioning loop is designed such that the first expansion device inlet is in communication with the condenser, the first expansion device outlet is in communication with the evaporator, the second expansion device inlet is in communication with the evaporator and the second expansion device outlet is in communication with the compressor.

The present invention will be better understood, and further features and advantages will also become apparent from reading the following detailed description, comprising embodiments which have been given by way of illustration with reference to the appended figures, which are given by way of nonlimiting examples and may serve to further the understanding of the present invention and explain how it is embodied and, where appropriate, contribute toward defining it, and in which:

A motor vehicle is equipped with a heating, ventilation and/or air conditioning installation for modifying the aerothermal properties of an air flow 1 that is able to be delivered into the interior of a passenger compartment of the vehicle. To this end, the heating, ventilation and/or air conditioning installation comprises a heating, ventilation and/or air conditioning unit that makes it possible to channel the circulation of the air flow 1 before it is delivered into the interior of the passenger compartment. The heating, ventilation and/or air conditioning system consists mainly of a housing made of plastics material that is housed under an instrument panel of the vehicle.

Figure 1:
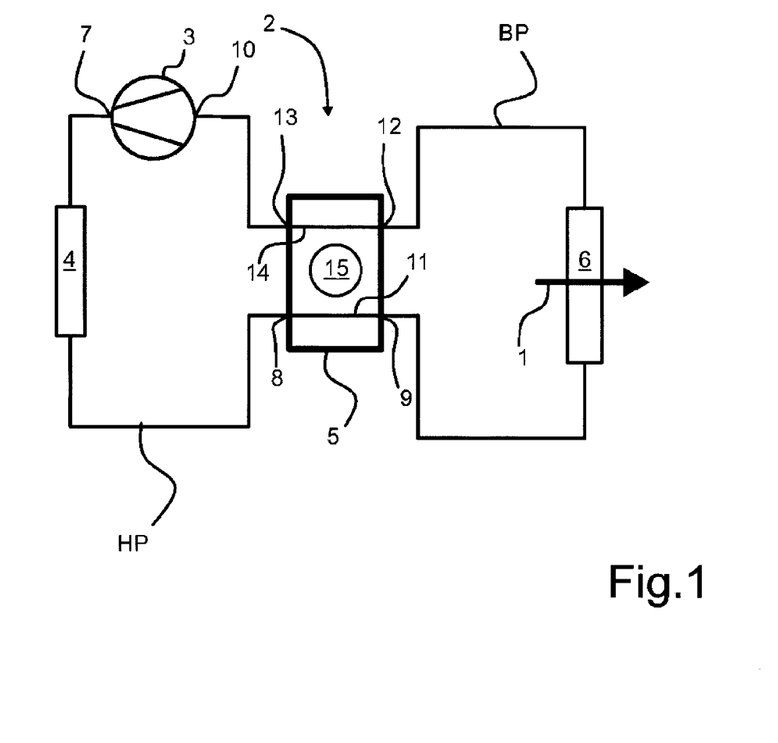
FIG. 1 is a schematic illustration of an air conditioning loop according to the present invention.

In order to cool the air flow 1 before it is delivered into the passenger compartment, the heating, ventilation and/or air conditioning installation comprises an air conditioning loop 2, as is illustrated schematically in FIG. 1, inside which there circulates a refrigerant fluid, advantageously a subcritical refrigerant fluid such as the one known under the designation R134a.

The air conditioning loop 2 comprises, in particular, a compressor 3, a condenser 4, an expansion device 5 and an evaporator 6. The compressor 3 is provided to carry the high-pressure refrigerant fluid. The condenser 4 is able to allow heat exchange between the refrigerant fluid and its environment, in particular a fluid of outside air. Preferably, the heat exchange inside the condenser 4 takes place at a relatively constant pressure. The expansion device 5 is provided to allow an expansion of the refrigerant fluid. The evaporator 6 is able to allow heat exchange between the refrigerant fluid and the air flow 1. The evaporator 6 is housed inside the heating, ventilation and/or air conditioning unit in order to cool and/or dehumidify the air flow 1 which passes through it, before said air flow 1 is delivered into the passenger compartment.

Thus, the air conditioning loop 2 comprises a high-pressure line HP contained between a compressor outlet 7 and a first expansion device inlet 8, and a low-pressure line BP contained between a first expansion device outlet 9 and a compressor inlet 10.

The expansion device 5 has a first refrigerant fluid circulation channel 11 that connects the first expansion device inlet 8 and the first expansion device outlet 9. The refrigerant fluid is expanded inside the first refrigerant fluid circulation channel 11.

The expansion device 5 has a second expansion device inlet 12, preferably connected to the evaporator 6, and a second expansion device outlet 13, preferably connected to the compressor 3. The second expansion device inlet 12 and the second expansion device outlet 13 are connected together by way of a second refrigerant fluid circulation channel 14.

Thus, inside the air conditioning loop 2, the refrigerant fluid circulates from the compressor outlet 7 to the condenser 4, then passes into the interior of the expansion device 5 by way of the first expansion device inlet 8, then circulates inside the first refrigerant fluid circulation channel 11, is evacuated from the expansion device 5 through the first expansion device outlet 9, circulates inside the evaporator 6, passes into the interior of the expansion device 5 through the second expansion device inlet 12, circulates inside the second refrigerant fluid circulation channel 14, is evacuated from the expansion device 5 through the second expansion device outlet 13 and returns to the compressor 3.

The expansion device 5 is a thermostatic expansion device having a means 15 for regulating the expansion of the refrigerant fluid.

Reference will henceforth be made to FIGS. 2 to 5, which show schematic illustrations of variant embodiments of an expansion device according to the present invention, which is integrated into the air conditioning loop illustrated in FIG. 1.

In FIGS. 2 to 5, the means 15 for regulating the expansion of the refrigerant fluid comprises a first needle valve 16, which is housed in the first refrigerant fluid circulation channel 11, and a thermostatic sensor 17, which is in communication with the second refrigerant fluid circulation channel 14.

According to the exemplary embodiments in FIGS. 2 to 5, the first refrigerant fluid circulation channel 11 has a first communication duct 18 that connects an upstream part 22 and a downstream part 25 of the first refrigerant fluid circulation channel 11.

The first needle valve 16 is able to allow or prevent circulation of the refrigerant fluid inside the first communication duct 18, which is formed inside the first refrigerant fluid circulation channel 11.

The first communication duct 18 consists of a flow restriction of the refrigerant fluid between the first expansion device inlet 8 and the first expansion device outlet 9.

To this end, and according to an advantageous exemplary embodiment, the upstream part 22 of the first refrigerant fluid circulation channel 11 consists of a first chamber 22, which is formed between the first expansion device inlet 8 and the first communication duct 18. The downstream part 25 of the first refrigerant fluid circulation channel 11 is formed between the first communication duct 18 and the first expansion device outlet 9.

The first needle valve 16 is able to move between an open position, in which the first needle valve 16 allows circulation of the refrigerant fluid inside the first communication duct 18, and a closed position, in which the first needle valve 16 prevents such circulation.

The first needle valve 16 is equipped with a first linking rod 19, which is in communication with the thermostatic sensor 17. More particularly, the thermostatic sensor 17 comprises a membrane 20, the position of which is able to vary depending on the pressure.

The membrane 20 provides a contact surface S with the refrigerant fluid circulating inside the second refrigerant fluid circulation channel 14. The membrane is sensitive to an evaporator outlet refrigerant fluid pressure Ps that prevails inside the second refrigerant fluid circulation channel 14. To this end, advantageously, the membrane 20 is a flexible membrane.

The evaporator outlet refrigerant fluid pressure Ps creates on the membrane 20 an evaporator outlet force Fs that results from the product of the contact surface S and the evaporator outlet refrigerant fluid pressure Ps.

When the evaporator outlet refrigerant fluid pressure Ps is greater than a first reference pressure PR1, which is in particular exerted on the membrane 20, the membrane 20 tends to position the first needle valve 16 in the closed position. By contrast, when the evaporator outlet refrigerant fluid pressure Ps is lower than the first reference pressure PR1, the membrane 20 tends to position the first needle valve 16 in the open position.

Preferably, the first reference pressure PR1 is proportional to the temperature of the refrigerant fluid 12.

The evaporator outlet force Fs, to which the membrane and, consequently, the first needle valve 16 is subjected by way of the first linking rod 19, satisfies the following relationship [1]:

$$Fs=Ps*S \quad [1]$$

The first needle valve 16 is housed inside the first chamber 22 formed inside the first refrigerant fluid circulation channel 11. Inside the first chamber 22, the refrigerant fluid coming from the condenser 4 is at a high pressure Ph.

Figure 2:
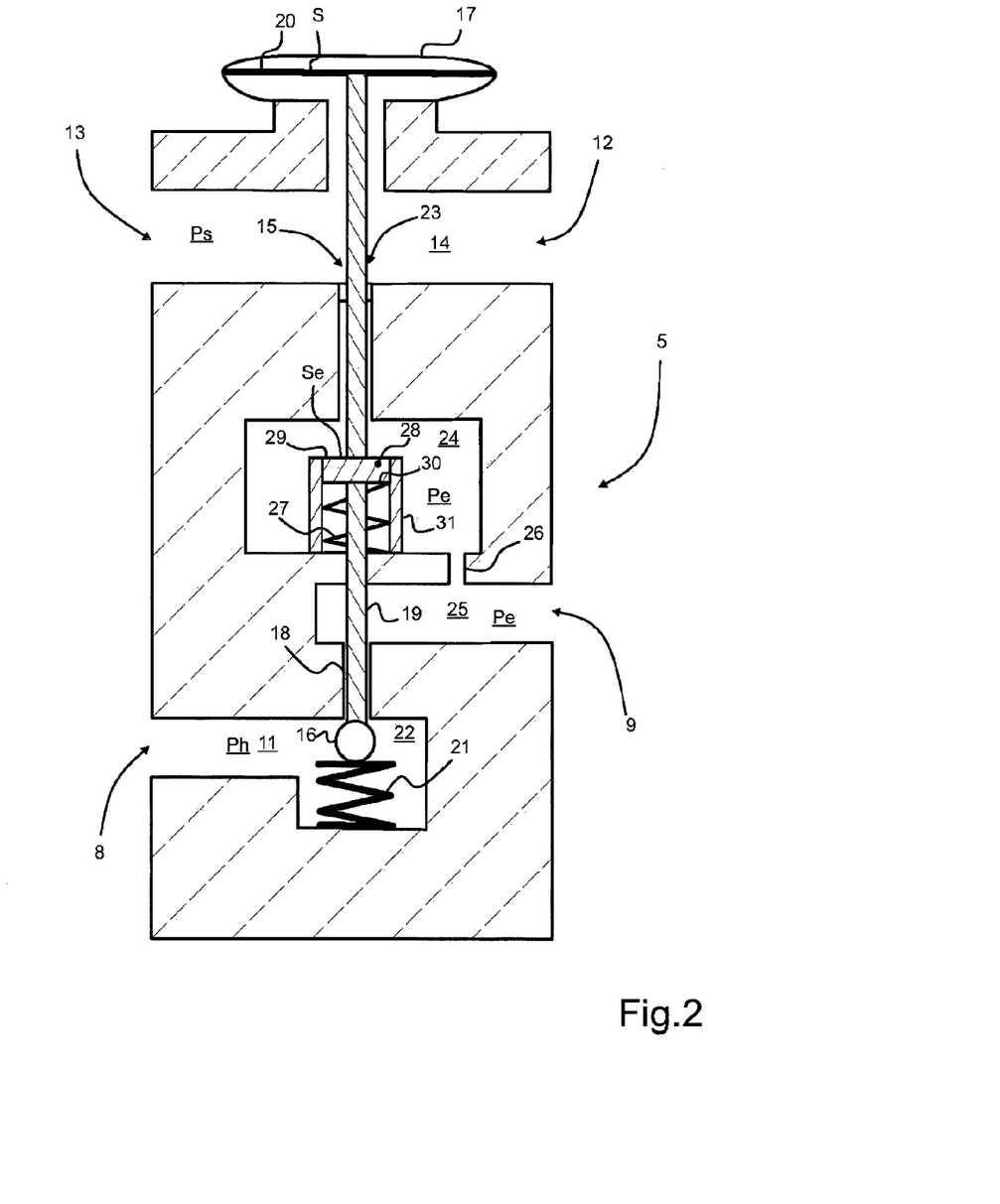
FIGS. 2 to 5 are schematic illustrations of variant embodiments of an expansion device according to the present invention, said expansion device being integrated in the air conditioning loop illustrated in FIG. 1.
Figure 3:
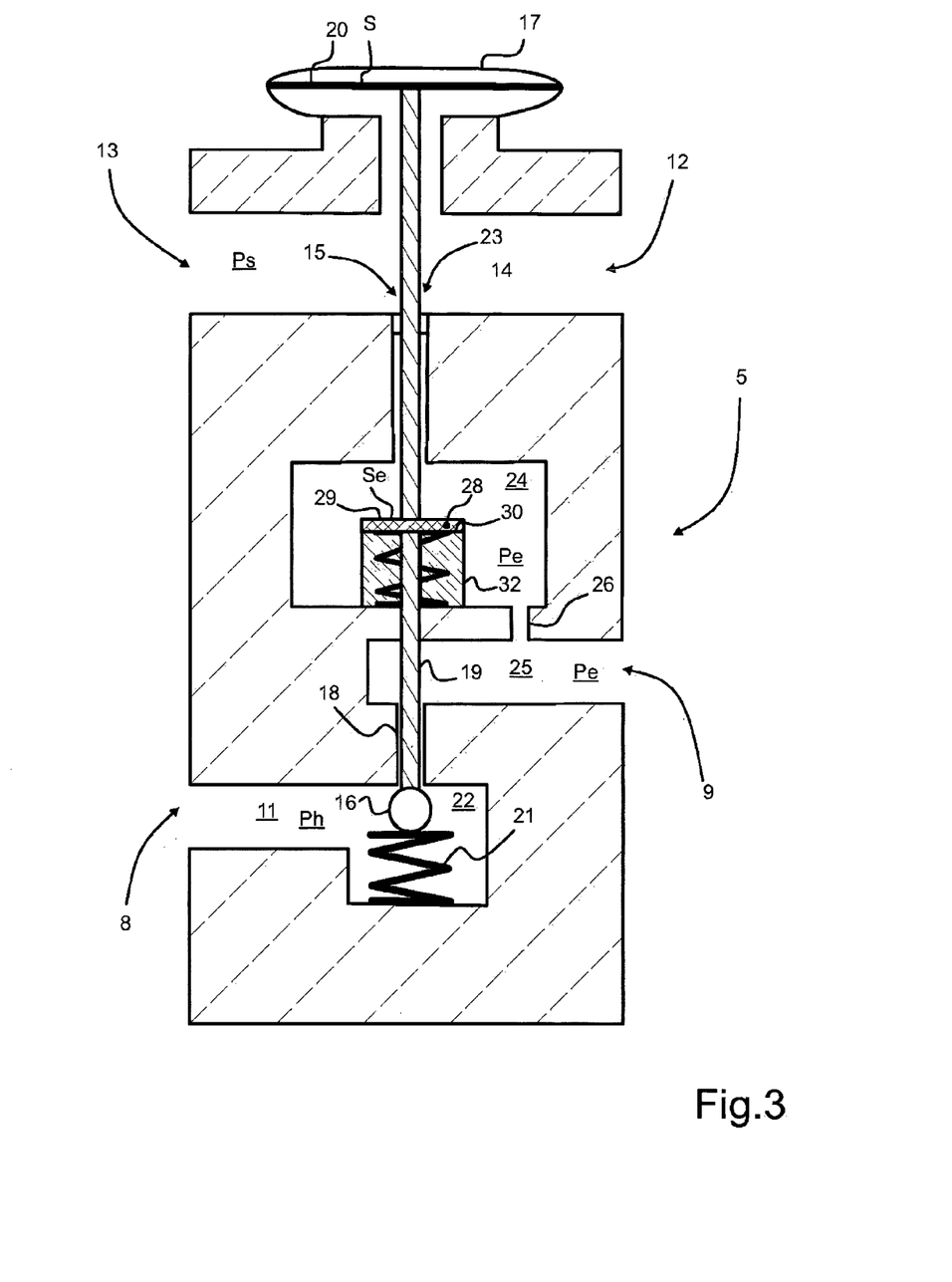
Figure 4:
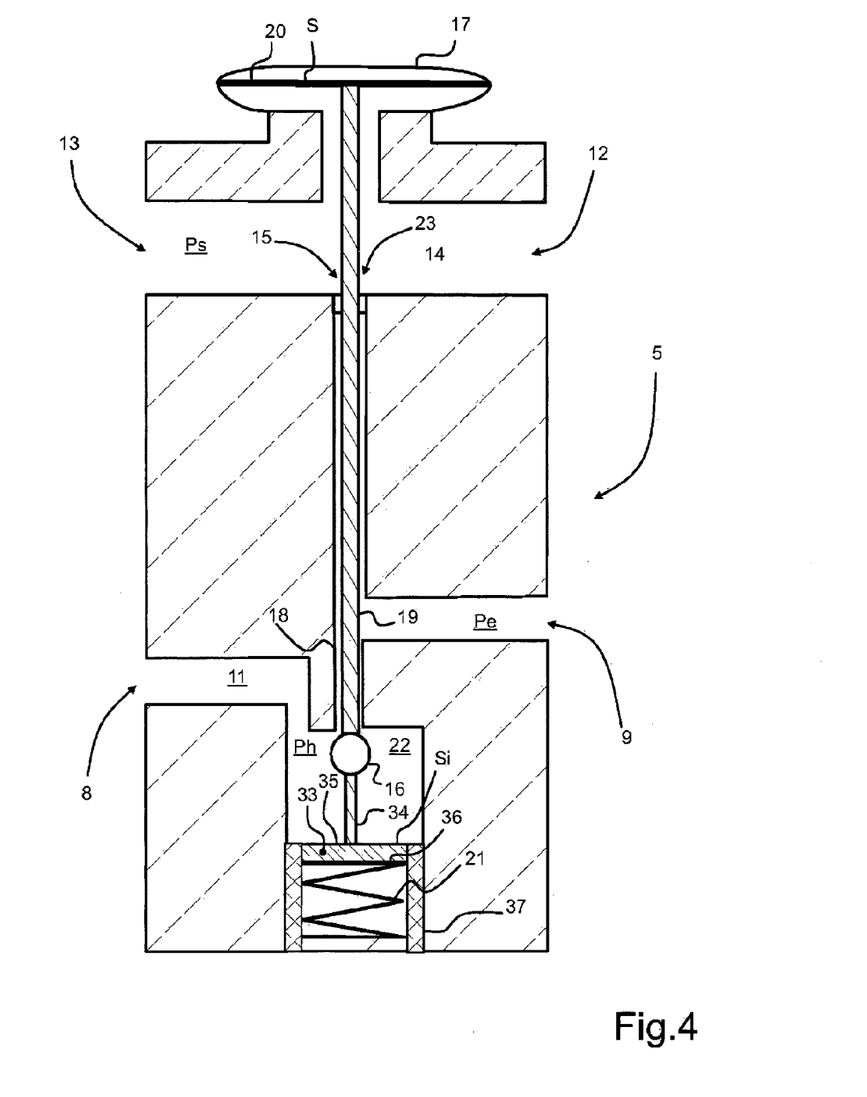

In FIGS. 2 to 4, the first needle valve 16 is in communication with a stressing member 21, such as a spring 21 or the like. In the exemplary embodiments, the spring 21 tends to keep the first needle valve 16 in the closed position. The spring 21 exerts a first return force Fr1 on the first needle valve 16.

The first return force Fr1 results from the product between a stiffness K1 of the spring 21 and a movement X of the first needle valve 16 with respect to a neutral original position X0, in particular the position in which the first needle valve 16 is in the closed position.

The first return force Fr1, to which the first needle valve 16 and, consequently, the membrane 20 are subjected by way of the first rod 19, satisfies the following relationship [2]:

$$Fr1=K1*X \quad [2]$$

In order to optimize thermal performance, that is to say an ability to best cool the air flow 2, to reduce energy consumption of the compressor 3 and to improve thermostatic stability inside the expansion device 5, the present invention proposes that the means 15 for regulating the expansion of the refrigerant fluid takes into account information in relation to an evaporator inlet refrigerant fluid pressure Pe. The evaporator inlet refrigerant fluid pressure Pe is substantially the same as the pressure prevailing at the first expansion device outlet 9. To this end, the means 15 for regulating the expansion of the refrigerant fluid comprises a means 23 for measuring the evaporator inlet refrigerant fluid pressure Pe advantageously taken at the first expansion device outlet 9.

In FIGS. 2 and 3, the means 23 for measuring the evaporator inlet refrigerant fluid pressure Pe consists of a second chamber 24, which is in communication with the downstream part 25 of the first refrigerant fluid circulation channel 11 by way of a second communication duct 26.

The second chamber 24 houses a return member 27 that preferably acts on a plate 28 secured to the first linking rod 19.

The plate 28 has a useful face 29, an upper face 29 according to the embodiments in FIGS. 2 and 3, which is in contact with the refrigerant fluid, and an isolated face 30, a lower face 20 according to the embodiments in FIGS. 2 and 3.

The useful face 29 of the plate 28 affords a useful surface S2 which is subjected to the evaporator inlet refrigerant fluid pressure Pe, such that the useful face 29 is subjected to an evaporator inlet force Fe.

By way of the first linking rod 19, the evaporator inlet force Fe is applied to the first needle valve 16 and, consequently, to the membrane 20, and satisfies the following relationship [3]:

$$Fe=Pe*Se \quad [3]$$

The return member 27 consists in particular of a spring 27 that exerts a second return force Fr2, in particular on the plate 28. The second return force Fr2 results from the product between a stiffness K2 of the return member 27 and the movement X' of the plate 28 with respect to the neutral original position X'0.

According to a particular embodiment, the movement X of the first needle valve 16 is identical to the movement X' of the plate 28.

The second return force Fr2, to which the first needle valve 16 and the membrane 20 are subjected by way of the first rod 19, satisfies the following relationship [4]:

$$Fr2=K2*X' \quad [4]$$

At equilibrium, the balance of the forces applied to the membrane 20 is given by the following relationship [5]:

$$PR1*S+Pe*Se=K1*X+K2*X'+Ps*S \quad [5]$$

These arrangements are such that, on the basis of an appropriate choice of the values of the contact surface S, of the useful surface Se of the measurement means 23, of the stiffness K1 of the stressing member 21 and of the stiffness K2 of the return means 27, the present invention proposes effectively regulating the expansion of the refrigerant fluid with an optimized thermal performance, low energy consumption of the compressor 3 and improved thermostatic stability inside the expansion device 5.

In FIG. 2, the plate 28 slides inside a sheath 31 which isolates the lower face 30 of the plate 28 from the refrigerant fluid.

In FIG. 3, the plate 28 is provided with a bellows 32 made of flexible material, which isolates the lower face 30 of the plate 28 from the refrigerant fluid. The bellows 32 is, for example, arranged in the manner of a concertina in order to be deformed during the movement of the plate 28. The bellows 32 exerts a force complementary to the second return force Fr2.

In FIG. 4, the first needle valve 16 is connected to a support plate 33 arranged inside the upstream part 22 of the first refrigerant fluid circulation channel 11 by way of a second linking rod 34. The support plate 33 is interposed between the first needle valve 16 and the stressing member 21, in particular the spring 21.

The support plate 33 has a useful face 35, an upper face 35 according to the embodiment in FIG. 4, which is in contact with the refrigerant liquid, and an isolated face 36, a lower face 36 according to the embodiment in FIG. 4. In particular, the isolated surface 36 is not in contact with the refrigerant liquid by way of a sleeve 37, inside which the support plate 33 is able to slide.

As a result, the refrigerant fluid exerts on the useful face 35 of the support plate 33 affords a useful surface Si subjected to the refrigerant fluid pressure which is equal to the high pressure Pi, such that the useful face 35 of the support plate 33 is subjected to an internal force Fi.

The internal force Fi, to which the first needle valve 16 and, consequently, the membrane 20 are subjected by way of the first linking rod 19 and the second linking rod 34, satisfies the following relationship [6]:

$$Fi = Ph*Si \quad [6]$$

At equilibrium, the balance of the forces applied to the membrane 20 is given by the following relationship [7]:

$$PR1*S + Ph*Si = Ps*S + K1*X \quad [7]$$

These arrangements are such that, on the basis of an appropriate choice of the values of the contact surface S, of the useful surface Si of the support plate 33 and of the stiffness K1 of the stressing member 21, the present invention proposes effectively regulating the expansion of the refrigerant fluid while attaining an optimized thermal performance, low energy consumption of the compressor 3 and improved thermostatic stability inside the expansion device 5.

Figure 5:
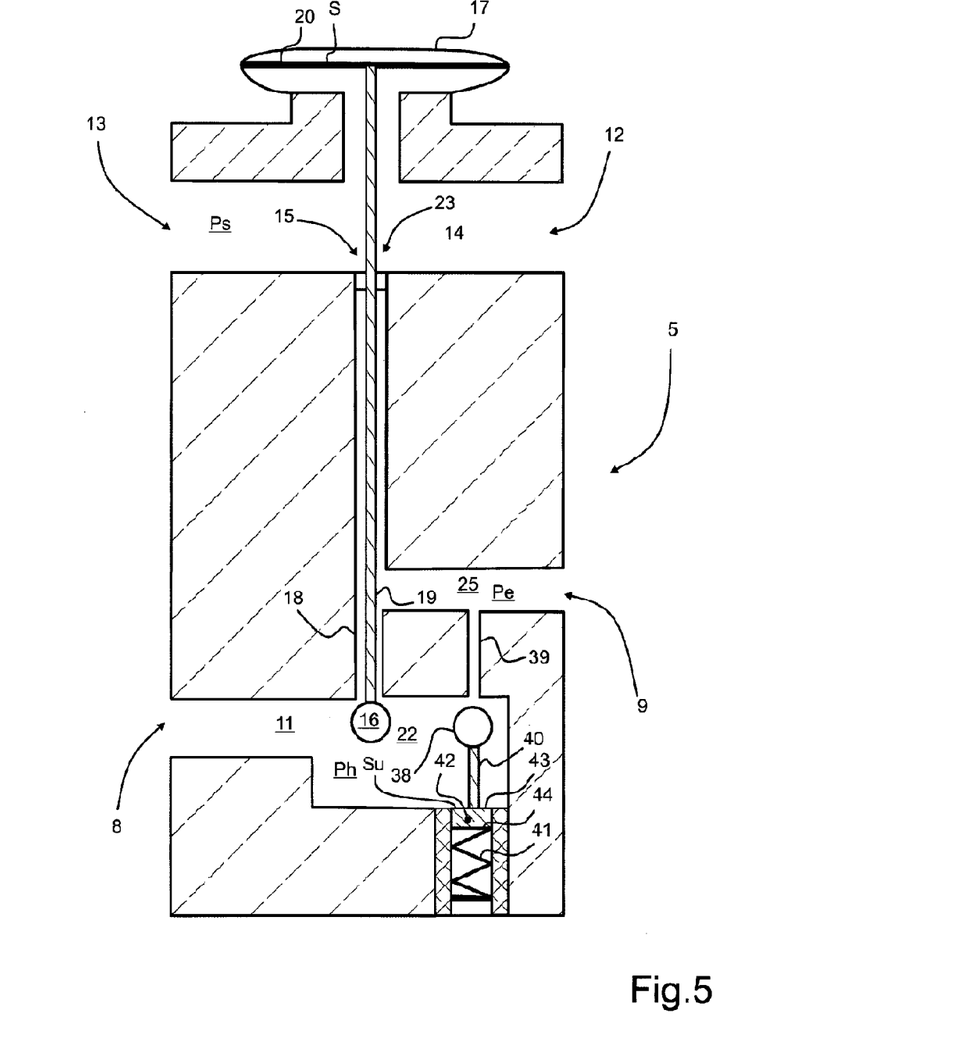

In FIG. 5, the means 23 for measuring the evaporator inlet refrigerant fluid pressure Pe consists of a second needle valve 38. The second needle valve 38 is able to move between an open position, in which the second needle valve 38 allows the refrigerant fluid to pass between the upstream part 22, in particular the first chamber 22, and the downstream part 24 of the first refrigerant fluid circulation channel 11 by way of a third communication duct 39, and a closed position, in which the second needle valve 38 prevents such a passage.

The second needle valve 38 is carried by a support rod in communication with a return member 41. In particular, the return member 41 acts on a plate 42 linked to the support rod 40.

The plate 42 affords a useful face 43, an upper face 43 according to the embodiment in FIG. 5, which is in contact with the refrigerant fluid, and an isolated face 44, a lower face 44 according to the embodiment in FIG. 5.

The useful face 43 is a useful surface Su. As a result, the refrigerant fluid exerts, on the useful face 43, a useful force Fu. The useful force Fu, to which the second needle valve 38 is subjected by way of the support rod 40, satisfies the following relationship [8]:

$$Fu = Ph*Su \quad [8]$$

The return member 41 is in particular a spring 41 that exerts a third return force Fr3 on the plate 42, which results from the product between a stiffness K3 of the return member 41 and the movement Y of the plate 42 with respect to a neutral original position Y0. The third return force Fr3, to which the second needle valve 38 is subjected, satisfies the following relationship [9]:

$$Fr3 = K3*Y \quad [9]$$

At equilibrium, the balance of the forces applied to the second needle valve 38 is given by the following relationship [10]:

$$Ph*Su = K3*Y \quad [10]$$

These arrangements are such that, on the basis of an appropriate choice of the values of the useful surface Su of the plate 42 and of the stiffness K3 of the return member 41, the present invention proposes effectively regulating the expansion of the refrigerant fluid while attaining an optimized thermal performance, low energy consumption of the compressor 3 and improved thermostatic stability inside the expansion device 5.

Finally, it will be noted that various embodiments can be realized according to the principles of the invention. However, it must be understood that these operating examples are given by way of illustration of the subject of the invention. Of course, the invention is not limited to these above-described embodiments which are given solely by way of example. It encompasses various modifications, alternative forms and other variants which a person skilled in the art could envisage within the scope of the present invention, and in particular any combination of the various embodiments described above.

In addition, the various above-described modes of operation can be taken individually or in combination in order to realize alternative embodiments and various configurations of a heating, ventilation and/or air conditioning installation as defined in the present invention.

The invention claimed is:

1. A device (5) for expanding a refrigerant fluid, comprising:
    a first expansion device inlet (8);
    a first expansion device outlet (9) connected to the first expansion device inlet (8) by a first refrigerant fluid circulation channel (11), wherein the first refrigerant fluid circulation channel (11) comprises an upstream part (22) in communication with a downstream part (25) by a first communication duct (18);
    a second expansion device inlet (12);
    a second expansion device outlet (13) connected to the second expansion device inlet (12) by a second refrigerant fluid circulation channel (14); and
    means (15) for regulating expansion of the refrigerant fluid comprising a first needle valve (16) housed inside the upstream part (22) of the first refrigerant fluid circulation channel (11) and a means (23) for measuring an evaporator inlet refrigerant fluid pressure (Pe) taken at the first expansion device outlet (9), wherein the first needle valve (16) is connected by a first linking rod (19) to a thermostatic sensor (17) in communication with the second refrigerant fluid circulation channel (14), wherein the means (23) for measuring an evaporator inlet refrigerant fluid pressure (Pe) comprises a support plate (33) housed inside the upstream part (22) of the first refrigerant fluid circulation channel (11), and wherein the support plate (33) has a lower surface (36) in contact with a stressing member (21) and is connected to the first needle valve (16) by a second linking rod (34).

2. The device (5) as claimed in claim 1, wherein the support plate (33) is mounted to be able to slide inside a sleeve (37).

3. The device (5) as claimed in claim 1, wherein the stressing member (21) is a spring.

4. The device (5) as claimed in claim 1, wherein the thermostatic sensor (17) includes a flexible membrane (20).

5. A device (5) for expanding a refrigerant fluid, comprising:
a first expansion device inlet (8);
a first expansion device outlet (9) connected to the first expansion device inlet (8) by a first refrigerant fluid circulation channel (11), wherein the first refrigerant fluid circulation channel (11) comprises an upstream part (22) in communication with a downstream part (25) by a first communication duct (18);
a second expansion device inlet (12);
a second expansion device outlet (13) connected to the second expansion device inlet (12) by a second refrigerant fluid circulation channel (14); and
means (15) for regulating expansion of the refrigerant fluid comprising a first needle valve (16) housed inside the upstream part (22) of the first refrigerant fluid circulation channel (11) and a means (23) for measuring an evaporator inlet refrigerant fluid pressure (Pe) taken at the first expansion device outlet (9), wherein the first needle valve (16) is connected by a first linking rod (19) to a thermostatic sensor (17) in communication with the second refrigerant fluid circulation channel (14), wherein the means (23) for measuring the evaporator inlet refrigerant fluid pressure (Pe) taken at the first expansion device outlet (9) comprises a second needle valve (38) housed in the upstream part (22) of the first refrigerant fluid circulation channel (11), and wherein the second needle valve (38) is carried by a support rod (40) in communication with a plate (42) in contact with a return member (41).

6. The device (5) as claimed in claim 5, wherein the thermostatic sensor (17) includes a flexible membrane (20).

* * * * *

UNITED STATES PATENT AND TRADEMARK OFFICE
CERTIFICATE OF CORRECTION

PATENT NO. : 9,459,030 B2  
APPLICATION NO. : 13/641283  
DATED : October 4, 2016  
INVENTOR(S) : Jugurtha Benouali et al.

Page 1 of 1

It is certified that error appears in the above-identified patent and that said Letters Patent is hereby corrected as shown below:

On the Title Page

Assignee, please delete "Le Mesnil Denis (FR)" and replace with -- Le Mesnil Saint Denis (FR) --

Signed and Sealed this  
Seventh Day of March, 2017

Michelle K. Lee  
*Director of the United States Patent and Trademark Office*